US012600804B2

(12) United States Patent
Xie et al.

(10) Patent No.: US 12,600,804 B2
(45) Date of Patent: Apr. 14, 2026

(54) SYNERGISTIC COMBINATION FOR INHIBITING POLYMERIZATION

(71) Applicant: BL Technologies, Inc., Minnetonka, MN (US)

(72) Inventors: Xiaoan Xie, Shanghai (CN); Yongtao Shi, Shanghai (CN); Guixi Zhang, Shanghai (CN); Mei Zhang, Shanghai (CN)

(73) Assignee: BL TECHNOLOGIES, INC., Minnetonka, MN (US)

( * ) Notice: Subject to any disclaimer, the term of this patent is extended or adjusted under 35 U.S.C. 154(b) by 993 days.

(21) Appl. No.: 17/269,506

(22) PCT Filed: Aug. 24, 2018

(86) PCT No.: PCT/CN2018/102269
§ 371 (c)(1),
(2) Date: Feb. 18, 2021

(87) PCT Pub. No.: WO2020/037656
PCT Pub. Date: Feb. 27, 2020

(65) Prior Publication Data
US 2021/0179742 A1 Jun. 17, 2021

(51) Int. Cl.
*C08F 2/40* (2006.01)
*C08F 20/06* (2006.01)

(52) U.S. Cl.
CPC .............. *C08F 2/40* (2013.01); *C08F 20/06* (2013.01)

(58) Field of Classification Search
CPC ...................................................... C08F 2/40
See application file for complete search history.

(56) References Cited

U.S. PATENT DOCUMENTS

| | | | |
|---|---|---|---|
| 2,404,251 A | 7/1946 | Rummelsburg | |
| 3,907,754 A | 9/1975 | Tershansy et al. | |
| 3,962,189 A | 6/1976 | Russin et al. | |
| 4,060,529 A | 11/1977 | Slejko | |

(Continued)

FOREIGN PATENT DOCUMENTS

| | | |
|---|---|---|
| CA | 2061880 A1 | 10/1992 |
| CN | 101838377 A | 9/2010 |

(Continued)

OTHER PUBLICATIONS

Hama et al., English machine translation of JP 2013146696A. (Year: 2013).*

(Continued)

*Primary Examiner* — Peter F Godenschwager
(74) *Attorney, Agent, or Firm* — McCarter & English, LLP

(57) ABSTRACT

A synergistic polymerization inhibitor composition, the composition having a copper salt, and a manganese salt; a copper salt or a manganese salt, and a cationic polymer; or a phenothiazine and a manganese salt. A method for inhibiting polymerization of unsaturated polymerizable monomers, the method providing adding a synergistic polymerization inhibitor composition to an methacrylic acid manufacturing system or component thereof, the composition having a copper salt, and a manganese salt; a copper salt or a manganese salt, and a cationic polymer; or a phenothiazine and a manganese salt.

5 Claims, 2 Drawing Sheets

(56) References Cited

U.S. PATENT DOCUMENTS

| | | | |
|---|---|---|---|
| 4,507,495 | A | 3/1985 | Dougherty et al. |
| 4,638,079 | A | 1/1987 | Inskip et al. |
| 4,663,480 | A | 5/1987 | Inskip et al. |
| 4,814,493 | A | 3/1989 | Dougherty et al. |
| 5,171,888 | A | 12/1992 | Roling |
| 5,371,280 | A | 12/1994 | Haramaki et al. |
| 5,504,243 | A | 4/1996 | Sakamoto et al. |
| 6,504,061 | B1 | 1/2003 | Okamoto et al. |
| 6,540,881 | B1 | 4/2003 | Sakamoto et al. |
| 6,667,419 | B1 | 12/2003 | Matsumoto et al. |
| 6,888,025 | B2 | 5/2005 | Hirao et al. |
| 7,241,915 | B2 | 7/2007 | Ishida et al. |
| 7,253,313 | B2 | 8/2007 | Fauconet et al. |
| 7,880,029 | B2 | 2/2011 | Link et al. |
| 8,278,481 | B2 | 10/2012 | Sakamoto et al. |
| 8,530,700 | B2 | 9/2013 | Ho et al. |
| 9,206,109 | B2 | 12/2015 | Korn et al. |
| 9,212,122 | B2 | 12/2015 | Blum et al. |
| 9,359,273 | B2 | 6/2016 | Bektesevic et al. |
| 9,447,201 | B2 | 9/2016 | Kar et al. |
| 2003/0150705 | A1 | 8/2003 | Deshpande et al. |
| 2003/0176725 | A1 | 9/2003 | Ishida et al. |
| 2004/0011638 | A1 | 1/2004 | Lepizzera |
| 2004/0031674 | A1 | 2/2004 | Schroder |
| 2008/0128263 | A1 | 6/2008 | Ogawa et al. |
| 2009/0203938 | A1 | 8/2009 | Croizy et al. |
| 2010/0130766 | A1 | 5/2010 | Sakamoto |
| 2012/0077977 | A1 | 3/2012 | Bette et al. |
| 2015/0053619 | A1* | 2/2015 | Cao ...................... C02F 1/5245 210/667 |
| 2016/0122643 | A1 | 5/2016 | Fruchey et al. |
| 2017/0174604 | A1 | 6/2017 | Decourcy |
| 2018/0074434 | A1* | 3/2018 | Nito ................... G03G 15/0121 |

FOREIGN PATENT DOCUMENTS

| | | | |
|---|---|---|---|
| CN | 103582655 | A | 2/2014 |
| CN | 108026000 | A | 5/2018 |
| EP | 301879 | A2 | 2/1989 |
| EP | 371748 | A2 | 6/1990 |
| EP | 0685447 | A2 | 12/1995 |
| EP | 1388532 | B1 | 6/2008 |
| EP | 1388533 | B1 | 6/2008 |
| EP | 2398832 | A1 | 12/2011 |
| JP | 8-217726 | A | 8/1996 |
| JP | H09095465 | A | 4/1997 |
| JP | 2000053612 | A | 2/2000 |
| JP | 2001348359 | A | 12/2001 |
| JP | 2002003681 | A * | 1/2002 |
| JP | 2003113137 | A | 4/2003 |
| JP | 2012518077 | A | 8/2012 |
| JP | 2013146696 | A * | 8/2013 |
| JP | 2014507547 | A | 3/2014 |
| JP | 2016500377 | A | 1/2016 |
| TW | 201741277 | A | 12/2017 |
| WO | 1999043715 | A1 | 9/1999 |
| WO | 2001038285 | A1 | 5/2001 |

OTHER PUBLICATIONS

Seya et al. English machine translation of JP2002003681A. (Year: 2002).*

Office Action and Search Report issued in Taiwanese Application No. 108123271, with English translation, dated Feb. 10, 2022, 14 pages.

Office Action and Search Report issued in Chinese Patent Application No. 201880096888.X, with English Translation, dated Nov. 1, 2022, 15 pages.

Office Action and Search Report issued in Taiwan Patent Application No. 108123271, with English translation of Search Report, dated Dec. 19, 2022, 7 pages.

International Search Report and Written Opinion for International Application No. PCT/CN2018/102269, dated May 27, 2019.

Extended European Search Report issued in European Application No. 18930846.3, dated Apr. 19, 2022, 7 pages.

Office Action issued in Japanese Application No. 2021-509997, with English Translation, available online Apr. 12, 2022, 6 pages.

European Office Action for Application No. 25204340.1, dated Dec. 9, 2025, 10 pages.

* cited by examiner

SYNERGISTIC COMBINATION FOR INHIBITING POLYMERIZATION

FIELD OF INVENTION

The disclosed technology generally described hereinafter provides for a synergistic composition for inhibiting polymerization of unsaturated polymerizable monomers, and more specifically, a synergistic composition for polymerization inhibition of acrylic acid or methacrylic acid.

BACKGROUND OF THE INVENTION

A major problem with the manufacturing of unsaturated polymerizable monomers is the polymerization of said monomers. In the absence of efficient polymerization inhibitors or dispersants, the undesired polymerization during manufacturing causes many problems, like fouling or blocking of the equipment, which will reduce the run time or increase cost to clean the system. Thus, an efficient polymerization inhibitor or dispersant is preferred to keep the manufacturing smooth and safe.

There are many types of polymerization inhibitors or dispersants for this application, including phenols, hydroquinone, phenothiazine, copper salts, manganese salts, stable free radicals, like 4-hydroxy-(2,2,6,6-tetramethylpiperidin-1-yl)oxyl (or 4-hydroxy TEMPO), etc. Such inhibitors or dispersants can be used alone, or in combination, to inhibit polymerization. However, new inhibitors or dispersants with better inhibition efficiency are desired.

SUMMARY OF THE INVENTION

The disclosed technology generally described hereinafter provides for a composition and method for a synergistic polymerization inhibitor. In some embodiments, the composition comprises a copper compound, and a manganese compound.

In some embodiments, the copper compound is a copper salt selected from the group consisting of copper (II) acetate, copper (II) oxide, copper (II) sulfate, copper (II) chloride, copper (II) dithiocarbamate, copper (II) formate, copper (II) propionate, and copper (II) oleate. In some embodiments, the manganese compound is a manganese salt selected from the group consisting of manganese (II) acetate, manganese (II) oxide, manganese (II) sulfate, manganese (II) chloride, manganese (II) dithiocarbamate, manganese (II) acetylacetonate, manganese (II) formate, manganese (II) propionate, manganese (II) oleate, tricarbonyl(methylcyclopentadienyl) manganese, cyclopentadienyl manganese tricarbonyl, or combinations thereof.

In some embodiments, the copper compound is at least 100 ppm. In some embodiments, the manganese compound is at least 100 ppm. In some embodiments, the copper compound is between about 0.01 wt % and about 50 wt %. In some embodiments, the manganese compound is between about 0.01 wt % and about 50 wt %.

In yet another aspect of the disclosed technology, a synergistic polymerization inhibitor composition is provided. The composition comprises a copper compound or a manganese compound; and a cationic polymer.

In some embodiments, the copper compound is a copper salt selected from the group consisting of copper (II) acetate, copper (II) oxide, copper (II) sulfate, copper (II) chloride, copper (II) dithiocarbamate, copper (II) formate, copper (II) propionate, and copper (II) oleate. In some embodiments, the manganese compound is a manganese salt selected from the group consisting of manganese (II) acetate, manganese (II) oxide, manganese (II) sulfate, manganese (II) chloride, manganese (II) dithiocarbamate, manganese (II) acetylacetonate, manganese (II) formate, manganese (II) propionate, manganese (II) oleate, tricarbonyl(methylcyclopentadienyl) manganese, cyclopentadienyl manganese tricarbonyl, or combinations thereof.

In some embodiments, the cationic polymer has molecular weight greater than 500. In some embodiments, the cationic polymer comprises a plurality of repeating units, and wherein at least 20% of the repeating units are positively charged. In some embodiments, the cationic polymer is $[Al(OH)_nCl_{3-n}]_m$, where n=1.0 to 2.5, m≤20.

In some embodiments, the cationic polymer is selected from the group consisting of a polydiallyldialkylammonium salt, a polymer formed from an amine and epihalohydrin or dihaloalkane, an epichlorohydrin-dialkylamine polymer, an epichlorohydrin-dialkylamine-ethylenediamine polymer, a polymer formed from a vinyltrialkylammonium salt, a polyaluminum salt, a polymer of dialkylaminoalkyl (meth) acrylates, a polymer of dialkylaminoalkyl (meth) acrylamides, a poly[2-(acryloyloxy)ethyl]trimethylammonium salt, or a polymethacryloxyethyltrimethylammonium salt.

In some embodiments, the copper compound or manganese compound in the composition is at least 100 ppm, and the cationic polymer is at least 100 ppm. In some embodiments, the copper compound or manganese compound is between about 0.01 wt % and about 50 wt %. In some embodiments, the cationic polymer is between about 0.01 wt % and about 90 wt %.

In yet another aspect of the disclosed technology, a synergistic polymerization inhibitor composition is provided. The composition comprises a phenothiazine, and a manganese compound.

In some embodiments, the manganese compound is a manganese salt selected from the group consisting of manganese (II) acetate, manganese (II) oxide, manganese (II) sulfate, manganese (II) chloride, manganese (II) dithiocarbamate, manganese (II) acetylacetonate, manganese (II) formate, manganese (II) propionate, manganese (II) oleate, tricarbonyl(methylcyclopentadienyl)manganese, cyclopentadienyl manganese tricarbonyl, or combinations thereof.

In some embodiments, the phenothiazine is at least 100 ppm and the manganese compound is at least 100 ppm. In some embodiments, the phenothiazine is between about 0.01 wt % and about 80 wt %. In some embodiments, the manganese compound is between about 0.01 wt % and about 50 wt %.

In yet another aspect of the disclosed technology, a method for inhibiting polymerization of unsaturated polymerizable monomers is provided. The method comprises adding a synergistic polymerization inhibitor composition to a monomer manufacturing system or component thereof, the composition comprising, a copper salt and a manganese salt.

In some embodiments, the monomer is methacrylic acid, and the synergistic polymerization inhibitor composition inhibits methacrylic acid polymerization. In some embodiments, the monomer is an acrylate, and the synergistic polymerization inhibitor composition inhibits acrylate polymerization. In some embodiments, the monomer is a methacrylate, and the synergistic polymerization inhibitor composition inhibits methacrylate polymerization. In some embodiments, the monomer is an acrolein, and the synergistic polymerization inhibitor composition inhibits acrolein polymerization. In some embodiments, the monomer is an acrylonitrile, and the synergistic polymerization inhibitor composition inhibits acrylonitrile polymerization.

In some embodiments, the synergistic polymerization inhibitor composition is at least 10 ppm. In some embodiments, the synergistic polymerization inhibitor composition is about 10 wt %.

In yet another aspect of the disclosed technology, a method for inhibiting polymerization of unsaturated polymerizable monomers is provided. The method comprises adding a synergistic polymerization inhibitor composition to a monomer manufacturing system or component thereof, the composition comprising, a copper salt or a manganese salt, and a cationic polymer.

In some embodiments, the monomer is methacrylic acid, and the synergistic polymerization inhibitor composition inhibits methacrylic acid polymerization. In some embodiments, the monomer is an acrylate, and the synergistic polymerization inhibitor composition inhibits acrylate polymerization. In some embodiments, the monomer is a methacrylate, and the synergistic polymerization inhibitor composition inhibits methacrylate polymerization. In some embodiments, the monomer is an acrolein, and the synergistic polymerization inhibitor composition inhibits acrolein polymerization. In some embodiments, the monomer is an acrylonitrile, and the synergistic polymerization inhibitor composition inhibits acrylonitrile polymerization.

In some embodiments, the synergistic polymerization inhibitor composition is at least 10 ppm. In some embodiments, the synergistic polymerization inhibitor composition is about 10 wt %.

In yet another aspect of the disclosed technology, a method for inhibiting polymerization of unsaturated polymerizable monomers is provided. The method comprises adding a synergistic polymerization inhibitor composition to a monomer manufacturing system or component thereof, the composition comprising, a phenothiazine and a manganese salt.

In some embodiments, the monomer is methacrylic acid, and the synergistic polymerization inhibitor composition inhibits methacrylic acid polymerization. In some embodiments, the monomer is an acrylate, and the synergistic polymerization inhibitor composition inhibits acrylate polymerization. In some embodiments, the monomer is a methacrylate, and the synergistic polymerization inhibitor composition inhibits methacrylate polymerization. In some embodiments, the monomer is an acrolein, and the synergistic polymerization inhibitor composition inhibits acrolein polymerization. In some embodiments, the monomer is an acrylonitrile, and the synergistic polymerization inhibitor composition inhibits acrylonitrile polymerization.

In some embodiments, the synergistic polymerization inhibitor composition is about 10 wt %. In some embodiments, the synergistic polymerization inhibitor composition is at least 10 ppm.

BRIEF DESCRIPTION OF THE DRAWINGS

These and other features of the disclosed technology, and the advantages, are illustrated specifically in embodiments now to be described, by way of example, with reference to the accompanying diagrammatic drawings, in which.

DETAILED DESCRIPTION

Figure 1:
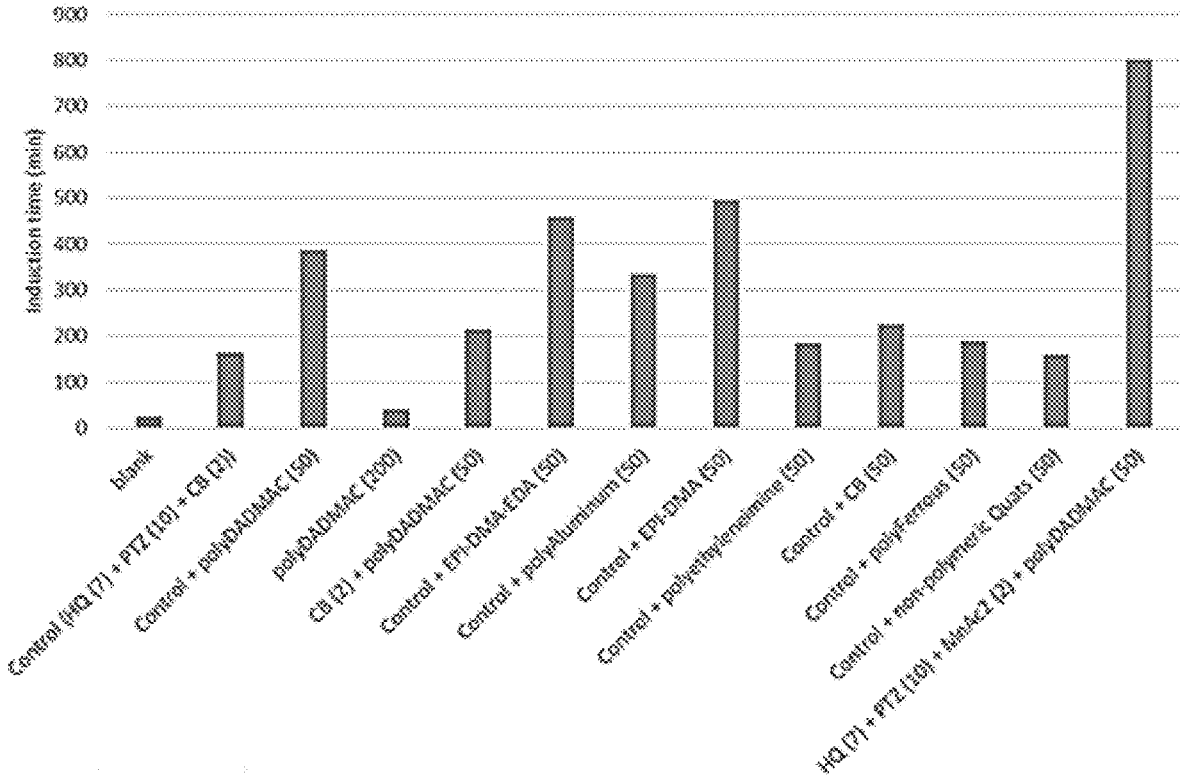
FIG. 1 is a graph providing results of an illustrative embodiment of the disclosed technology.
Figure 2:
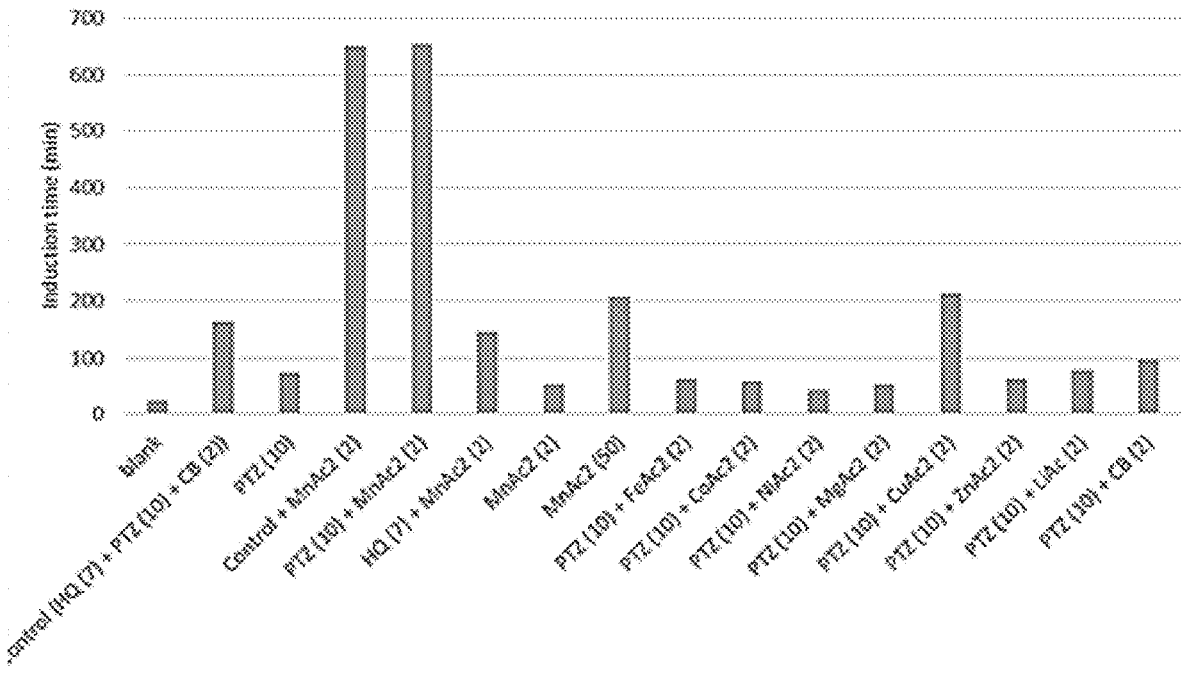
FIG. 2 is a graph providing results of an illustrative embodiment of the disclosed technology.

The disclosed technology generally described hereinafter provides for a synergistic composition for inhibiting polymerization of unsaturated polymerizable monomers, such as, but not limited to acrylic acid, methacrylic acid, acrylates, acrolein, and/or acrylonitrile monomers. More specifically, the disclosed technology provides a synergistic composition for polymerization inhibition of acrylic acid and/or methacrylic acid.

With the disclosed synergistic compositions and methods, manufacturers involving the aforementioned monomers allow systems to keep running for a longer time before a maintenance shutdown is needed, which will increase productivity and also reduce the cost to clean the equipment. This technology also reduces the safety risk from uncontrolled polymerization of the aforementioned monomers, such as, but not limited to acrylic acid, methacrylic acid, acrylates, methacrylates, acrolein, and/or acrylonitrile monomers.

The present technology provides for a synergistic polymerization inhibitor composition. In some embodiments, the synergistic polymerization composition comprises a copper compound and a manganese compound. These compounds can either be soluble or insoluble in water.

In some embodiments, the copper compound is a copper salt, and the manganese compound is a manganese salt. In some embodiments, the copper compound is selected from, but not limited to, copper (II) acetate, copper (II) oxide, copper (II) sulfate, copper (II) chloride, copper (II) dithiocarbamate, copper (II) formate, copper (II) propionate, copper (II) oleate, or combinations thereof. It should be understood by one skilled in the art that the copper compound can be selected from any copper (II) compounds that provide a similar effect.

In some embodiments, the copper compound is at least 100 ppm. In other embodiments, the copper compound is at least 200 ppm, and in other embodiments, at least 500 ppm. In some embodiments, the copper compound is less than 500,000 ppm, and in other embodiments, the copper compound is less than 100,000 ppm. In some embodiments, the copper compound is in the range between about 500 ppm and about 100,000 ppm.

In some embodiments, the copper compound is between about 0.01 wt % and about 50 wt %. In other embodiments, the copper compound is between about 0.02 wt % and 20 wt %, and in other embodiments, between about 0.05 wt % and 10 wt %.

In some embodiments, the manganese compound is selected from, but not limited to, manganese (II) acetate, manganese (II) oxide, manganese (II) sulfate, manganese (II) chloride, manganese (II) dithiocarbamate, manganese (II) formate, manganese (II) propionate, manganese (II) oleate, or combinations thereof. It should be understood by one skilled in the art that the manganese compound can be selected from any manganese (II) compounds that provide a similar effect.

In some embodiments, the manganese compound is at least 100 ppm. In other embodiments, the manganese compound is at least 200 ppm, and in other embodiments, at least 500 ppm. In some embodiments, the manganese compound is less than 500,000 ppm, and in other embodiments, the manganese compound is less than 100,000 ppm. In some embodiments, the manganese compound is between about 500 ppm and about 100,000 ppm.

In some embodiments, the manganese compound is between about 0.01 wt % and about 50 wt %. In other embodiments, the manganese compound is between about 0.02 wt % and 20 wt %, and in other embodiments, between about 0.05 wt % and 10 wt %.

In yet another aspect of the present technology, a synergistic polymerization inhibitor composition is provided. The synergistic polymerization inhibitor composition comprises a copper compound or a manganese compound, and a cationic polymer. In some embodiments, the synergistic polymerization inhibitor composition comprises a copper compound and a cationic polymer. In other embodiments, the synergistic polymerization inhibitor composition comprises a manganese compound and a cationic polymer.

In some embodiments, the synergistic polymerization inhibitor composition comprises a copper compound, wherein the copper compound comprises copper (II) acetate, copper (II) oxide, copper (II) sulfate, copper (II) chloride, copper (II) dithiocarbamate, copper (II) formate, copper (II) propionate, copper (II) oleate, or combinations thereof.

In some embodiments, the manganese compound comprises manganese (II) acetate, manganese (II) oxide, manganese (II) sulfate, manganese (II) chloride, manganese (II) dithiocarbamate, manganese (II) formate, manganese (II) propionate, manganese (II) oleate, or combinations thereof.

In some embodiments, the cationic polymer comprises a polydiallyldialkylammonium salt, a polymer formed from an amine and epihalohydrin or dihaloalkane, an epichlorohydrin-dialkylamine polymer, an epichlorohydrin-dialkylamine-ethylenediamine polymer, a polymer formed from a vinyltrialkylammonium salt, a polyaluminum salt, a polymer of dialkylaminoalkyl (meth) acrylates, a polymer of dialkylaminoalkyl (meth) acrylamides, a poly[2-(acryloyloxy)ethyl]trimethylammonium salt, a polymethacryloxyethyltrimethylammonium salt, or combination thereof. In other embodiments, the cationic polymer is selected from, but not limited to, the group consisting of a polydiallyldialkylammonium salt, a polymer formed from an amine and epihalohydrin or dihaloalkane, an epichlorohydrin-dialkylamine polymer, an epichlorohydrin-dialkylamine-ethylenediamine polymer, a polymer formed from a vinyltrialkylammonium salt, a polyaluminum salt, a polymer of dialkylaminoalkyl (meth) acrylates, a polymer of dialkylaminoalkyl (meth) acrylamides, a poly[2-(acryloyloxy)ethyl]trimethylammonium salt, a polymethacryloxyethyltrimethylammonium salt, or a combination thereof. In some embodiments, the cationic polymer is $[Al(OH)_nCl_{3-n}]_m$, where n=1.0 to 2.5, m≤20.

In some embodiments, the cationic polymer has a molecular weight greater than 500. In some embodiments, the cationic polymer comprises a plurality of repeating units. In such embodiments, at least 20% of the repeating units are positively charged, in other embodiments, at least 50% are positively charged, and in other embodiments, at least 80% are positively charged.

In some embodiments, the synergistic polymerization inhibitor composition comprises at least 100 ppm of the copper salt, and at least 100 ppm of the cationic polymer. In some embodiments, the copper salt or manganese salt is between about 0.01 wt % and about 50 wt %. In some embodiments, the cationic polymer is between about 0.01 wt % and about 90 wt %.

In yet another aspect of the present technology, a synergistic polymerization inhibitor composition comprising a phenothiazine and a manganese salt is provided.

In some embodiments, the manganese salt comprises manganese (II) acetate, manganese (II) oxide, manganese (II) sulfate, manganese (II) chloride, manganese (II) dithiocarbamate, manganese (II) acetylacetonate, manganese (II) formate, manganese (II) propionate, manganese (II) oleate, tricarbonyl(methylcyclopentadienyl)manganese, cyclopentadienyl manganese tricarbonyl, or combinations thereof.

In some embodiments, the phenothiazine is at least 100 ppm and the manganese salt is at least 100 ppm. In some embodiments, the phenothiazine is between about 0.01 wt % and about 80 wt %, in some embodiments, between about 0.02 wt % and about 50 wt %, and in other embodiments, between about 0.05 wt % and 20 wt %.

In some embodiments, the manganese salt is between about 0.01 wt % and about 50 wt %, in some embodiments, between about 0.02 wt % and about 20 wt %, and in other embodiments, between about 0.05 wt % and 10 wt %.

In yet another aspect of the present technology, a method for inhibiting the polymerization of unsaturated monomers is provided. In some embodiments, a method for inhibiting the polymerization of acrylic acid and methacrylic acid is provided. It should be understood by one skilled in the art that the present method can inhibit polymerization of other unsaturated polymerizable monomers, such as, but not limited to, acrylates, methacrylates, acrolein, and/or acrylonitrile monomers.

The method comprises adding a synergistic polymerization inhibitor composition to an acrylic acid or similar monomer manufacturing system or component thereof. Examples of such manufacturing systems and components include, but are not limited to, monomer absorption columns, monomer distillation columns, and/or monomer purification columns. In some embodiments, the synergistic polymerization inhibitor is added to a crude monomer stream. In some embodiments, the synergistic polymerization inhibitor is added to a monomer-solvent mixed stream. In other embodiments, the synergistic polymerization inhibitor is added to a crude methacrylic acid or acrylic acid stream.

In some embodiments, the synergistic polymerization inhibitor composition of the present method comprises a copper salt and a manganese salt. The synergistic polymerization inhibitor composition inhibits the polymerization of acrylic acid, methacrylic acid, acrylates, methacrylates, acroleins, and/or acrylonitriles.

In some embodiments, the synergistic polymerization inhibitor composition of the present method is at least 10 ppm of the crude monomer stream. In some embodiments, the crude monomer stream is an acrylic acid or methacrylic acid stream. In other embodiments, the synergistic polymerization inhibitor composition is present at about 10 wt % of the crude monomer stream.

In yet another aspect of the present technology, a method for inhibiting the polymerization of unsaturated monomers is provided. In some embodiments, a method for inhibiting the polymerization of methacrylic acid is provided. The method comprises adding a synergistic polymerization inhibitor composition to monomer manufacturing system or component thereof. In some embodiments, the monomer manufacturing system is a methacrylic acid manufacturing system or component thereof, where the composition comprises, a copper salt or a manganese salt, and a cationic polymer.

In some embodiments, the synergistic polymerization inhibitor composition concentration is at least 10 ppm of the crude monomer stream. In some embodiments, the synergistic polymerization inhibitor composition is about 10 wt % of the crude monomer stream.

In yet another aspect of the present technology, a method for inhibiting methacrylic acid is provided. The method comprises adding a synergistic polymerization inhibitor composition to a methacrylic acid manufacturing system or component thereof, the composition comprising, a phenothiazine and a manganese salt.

In some embodiments, the synergistic polymerization inhibitor composition is at least 10 ppm of the crude monomer stream. In other embodiments, the synergistic polymerization inhibitor composition is about 10 wt % of the crude monomer stream.

EXAMPLES

The present invention will be further described in the following examples, which should be viewed as being illustrative and should not be construed to narrow the scope of the invention or limit the scope to any particular invention embodiments.

Acrylic acid polymerization inhibition was tested through the induction time test, by heating acrylic acid with or without inhibitors in a hot oil bath and measuring the time before the mixture turns cloudy or loses flowability. For example, flowability can be determined by gel formation and/or increased viscosity. Water or other solvent (such solvents can include, but are not limited to toluene, methyl isobutyl ketone, or ethyl acetate) can be added into acrylic acid to test. The test can be performed in an inert gas atmosphere (i.e. nitrogen, or argon gas), or in air or oxygen. The time before the mixture turns cloudy or gelled (i.e. loses flowability) was recorded as induction time, where the longer induction time indicates better efficiency to inhibit polymerization.

In the following examples, a standardized test condition was set to: heat 20 mL distilled acrylic acid, and 1 mL deionized water in a testing bottle immersed in a hot oil bath set at 140° C., and inhibitors for testing were added into the mixture and well mixed before the testing bottle been immersed in the hot oil bath. 50 mL/min air bubbling were kept throughout the entire process. The time that the mixture turns from clear to cloudy or gelled was recorded as induction time.

A. Synergistic Combination of Copper Salt and Manganese Salt

It was determined that the synergistic combination of manganese (Mn) salt (e.g. manganese (II) acetate) and copper (Cu) salt (e.g. copper (II) acetate) performed much better than the single use of each metal salt alone. This synergistic composition also performed significantly better than current inhibitors in the market used for acrylic acid manufacturing. For example, such inhibitors include, but are not limited to, hydroquinone (HQ), phenothiazine (PTZ), MEHQ, 4-OH TEMPO, copper dithiocarbamate, nitrosobenzene, and/or manganese acetate.

Table 1 provides the testing results of the synergistic combination of manganese salt and copper salt. Table 1 shows the significant improvement on polymerization inhibition from the synergistic combination of Mn and Cu salts. EXP. 1 was a blank control without any inhibitor addition. EXP. 9 contained a widely used combination of three inhibitors, (hydroquinone (HQ), phenothiazine (PTZ) and copper dithiocarbamate salt (CB)).

TABLE 1

Inhibitor Induction Time Test in Acrylic Acid

| EXP. | HQ[a] (ppm) | PTZ[b] (ppm) | Mn (II)[c] (ppm) | Cu (II)[d] (ppm) | Cationic polymer[e] (ppm) | Induction Time (mins) |
|---|---|---|---|---|---|---|
| 1 | | | | | | 26[f] |
| 2 | | | | 4 | | 26 |
| 3 | | | 4 | | | 71 |

TABLE 1-continued

Inhibitor Induction Time Test in Acrylic Acid

| EXP. | HQ[a] (ppm) | PTZ[b] (ppm) | Mn (II)[c] (ppm) | Cu (II)[d] (ppm) | Cationic polymer[e] (ppm) | Induction Time (mins) |
|---|---|---|---|---|---|---|
| 4 | | | 2 | 2 | | 626 |
| 5 | | | 9 | 2 | | 743 |
| 6 | | | 6 | 1 | | 659 |
| 7 | | | 6 | 3 | | 1012 |
| 8 | | 10 | | | | 75 |
| 9 | 7 | 10 | | 2[g] | | 164 |
| 10 | 7 | 10 | | 2[g] | 50 (Cat. A) | 388 |
| 11 | 7 | 10 | | 2 | 50 (Cat. A) | 381 |
| 12 | | | | 2[g] | 50 (Cat. A) | 215 |
| 13 | 7 | 10 | | 2[g] | 25 (Cat. A) | 316 |
| 14 | 7 | 10 | | 2[g] | 50 (Cat. B) | 458 |
| 15 | 7 | 10 | | 2[g] | 50 (Cat. C) | 333 |
| 16 | 7 | 10 | | 2[g] | 50 (Cat. D) | 496 |
| 17 | 7 | 10 | 2 | | 50 (Cat. A) | 803 |
| 18 | 7 | 10 | 2 | | | 649 |
| 19 | | 10 | 2 | | | 655 |
| 20 | 7 | 10 | 2 | 2 | | 650 |

[a]Hydroquinone concentration in solution based on acrylic acid amount
[b]Phenothiazine concentration in solution based on acrylic acid amount
[c]Mn salt concentration in solution based on acrylic acid amount (added as manganese acetate)
[d]Cu salt concentration in solution based on acrylic acid amount (added as copper acetate)
[e]Cationic polymer concentration in solution based on amount of acrylic acid
[f]Without any additives
[g]Cu salt was added as copper dibutyldithiocarbamate instead of copper acetate The results in EXP. 2-7 in Table 1 demonstrate that the combination of Mn and Cu compounds (i.e. salts) provide a synergistic effect and has superior performance than the market used inhibitors as in EXP. 9, or the single metals when used alone (EXP. 2 & 3).

B. Synergistic Combination of Copper/Manganese Salt and Cationic Polymer

EXP. 10-17 in Table 1 demonstrated that the synergistic combination of copper or manganese salt and a cationic polymer provided significantly better polymerization inhibition than current inhibition products in the market used for acrylic acid manufacturing. Examples of such cationic polymers tested include polydiallyldimethylammonium chloride, polymer from epichlorohydrin-dimethylamine-ethylenediamine, polyaluminum chloride, and polymer from epichlorohydrin-dimethylamine. (See Table 2 below.)

TABLE 2

Illustration of cationic polymers

| | |
|---|---|
| Cat. A | polydiallyldimethylammonium chloride |
| Cat. B | polymer from epichlorohydrin-dimethylamine-ethylenediamine |
| Cat. C | polyalumium chloride |
| Cat. D | polymer from epichlorohydrin-dimethylamine |

C. Synergistic Combination of Phenothiazine (PTZ) and Manganese Salt

EXP. 17-20 in Table 1 demonstrated that the combination of PTZ and manganese compound provided significantly better polymerization inhibition than current inhibition products in the market used for acrylic acid manufacturing.

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A synergistic polymerization inhibitor composition, the composition comprising:

A. copper dibutyldithiocarbamate, phenothiazine, hydroquinone, and a cationic polymer selected from polydiallyldimethylammonium chloride, a polymer from epichlorohydrin-dimethylamine-ethylenediamine, polyaluminum chloride, and a polymer from epichlorohydrin-dimethylamine; or B. copper acetate or manganese acetate, phenothiazine, hydroquinone, and polydiallyldimethylammonium chloride.

2. A method for inhibiting polymerization of unsaturated polymerizable monomers, the method comprising:

adding the synergistic polymerization inhibitor composition as recited in claim 1 to a monomer manufacturing system or component thereof.

3. The method as recited in claim 2, wherein the monomer is (i) methacrylic acid, and the synergistic polymerization inhibitor composition inhibits methacrylic acid polymerization; (ii) an acrylate, and the synergistic polymerization inhibitor composition inhibits acrylate polymerization; (iii) a methacrylate, and the synergistic polymerization inhibitor composition inhibits methacrylate polymerization; (iv) an acrolein, and the synergistic polymerization inhibitor composition inhibits acrolein polymerization; or (v) an acrylonitrile, and the synergistic polymerization inhibitor composition inhibits acrylonitrile polymerization.

4. The method as recited in claim 2, wherein the synergistic polymerization inhibitor composition is at least 10 ppm.

5. The method as recited in claim 2, wherein the synergistic polymerization inhibitor composition is about 10 wt %.

* * * * *